United States Patent
Burgoon et al.

(10) Patent No.: US 9,291,227 B2
(45) Date of Patent: Mar. 22, 2016

(54) BRAKE ROTOR AND ABS TONE RING ATTACHMENT ASSEMBLY THAT PROMOTES IN PLANE UNIFORM TORQUE TRANSFER DISTRIBUTION

(75) Inventors: Donald Burgoon, Gastonia, NC (US); Wenqi Qian, Carrollton, TX (US); Scott Andrew Paul, Lake Wylie, SC (US); Craig A. Van Harken, Charlotte, NC (US)

(73) Assignee: PERFORMANCE FRICTION CORPORATION, Clover, SC (US)

( * ) Notice: Subject to any disclaimer, the term of this patent is extended or adjusted under 35 U.S.C. 154(b) by 1089 days.

(21) Appl. No.: 12/088,826

(22) PCT Filed: Oct. 2, 2006

(86) PCT No.: PCT/US2006/038498
§ 371 (c)(1),
(2), (4) Date: Jul. 17, 2008

(87) PCT Pub. No.: WO2007/041518
PCT Pub. Date: Apr. 12, 2007

(65) Prior Publication Data
US 2009/0218183 A1    Sep. 3, 2009

Related U.S. Application Data

(60) Provisional application No. 60/722,096, filed on Sep. 30, 2005.

(51) Int. Cl.
*F16D 65/12* (2006.01)
*B60T 8/32* (2006.01)
*F16D 65/02* (2006.01)

(52) U.S. Cl.
CPC ............... *F16D 65/12* (2013.01); *B60T 8/329* (2013.01); *F16D 65/123* (2013.01); *F16D 2065/136* (2013.01); *F16D 2065/1348* (2013.01);
(Continued)

(58) Field of Classification Search
CPC ............. B60T 8/329; F16D 65/123; F16D 2065/1384; F16D 2065/1348; F16D 2065/1392
USPC ..................................... 188/17, 18 A, 218 XL
See application file for complete search history.

(56) References Cited

U.S. PATENT DOCUMENTS 3,542,166 A * 11/1970 Harrison .................. 188/218 XL
5,007,508 A *  4/1991 Lacombe .................. 188/251 A
(Continued)

FOREIGN PATENT DOCUMENTS

DE    EP 0849487 A2 *  1/1997 .............. F16D 65/12
DE    10237504          3/2004
(Continued)

*Primary Examiner* — Thomas Irvin
(74) *Attorney, Agent, or Firm* — Roberts Mlotkowski Safran & Cole, P.C.

(57) ABSTRACT

A brake assembly for use on vehicles includes a rotor having connection tabs and a hub having bobbins, integrally formed or separate, with the rotor connection tabs being positioned between the hub bobbins and clamped together with a top plate. An ABS tone ring is fastened to the hub and is circumscribed by the rotor. Alternatively, an ABS tone ring can be formed as part of the top plate. A spring clip can be used with the top plate to accommodate thermal expansion of the rotor and eliminate rotor rattling. Torque is transferred from the brake rotor to the hub in a common plane to prevent twisting in the fastener connection.

19 Claims, 8 Drawing Sheets

(52) U.S. Cl.
CPC . *F16D2065/1384* (2013.01); *F16D 2065/1392* (2013.01); *F16D 2065/1396* (2013.01)

(56) References Cited

U.S. PATENT DOCUMENTS

| | | | |
|---|---|---|---|
| 5,291,130 A * | 3/1994 | Kendzior | 324/174 |
| 6,247,562 B1 * | 6/2001 | Gotti et al. | 188/218 XL |
| 6,267,210 B1 * | 7/2001 | Burgoon et al. | 188/218 XL |
| 6,446,765 B1 * | 9/2002 | Dabertrand et al. | 188/18 A |
| 6,467,588 B1 * | 10/2002 | Baumgartner et al. | 188/218 XL |
| 6,604,613 B2 * | 8/2003 | Burgoon et al. | 188/218 XL |
| 6,619,440 B2 * | 9/2003 | Antony et al. | 188/17 |
| 6,910,556 B1 * | 6/2005 | Baumgartner et al. | 188/218 XL |
| 6,997,292 B2 * | 2/2006 | Burgoon et al. | 188/218 XL |
| 7,007,247 B1 | 2/2006 | Wang et al. | |
| 7,963,375 B2 * | 6/2011 | Pahle | 188/218 XL |
| 2002/0175258 A1 | 11/2002 | White et al. | |
| 2004/0140164 A1 * | 7/2004 | Burgoon et al. | 188/218 R |
| 2005/0194224 A1 | 9/2005 | Burgoon et al. | |

FOREIGN PATENT DOCUMENTS

| | | |
|---|---|---|
| JP | 56-28448 | 3/1981 |
| JP | H01-237249 A | 9/1989 |
| JP | 2000-220673 | 8/2000 |
| JP | 2001-132784 A | 5/2001 |
| JP | 2002-79974 A | 3/2002 |
| JP | 2003-343619 A | 12/2003 |
| JP | 2004-509300 A | 3/2004 |
| JP | 2004-225889 A | 8/2004 |
| WO | 02/01088 | 1/2002 |
| WO | 02/101259 | 12/2002 |
| WO | 2004/063592 A1 | 7/2004 |

* cited by examiner

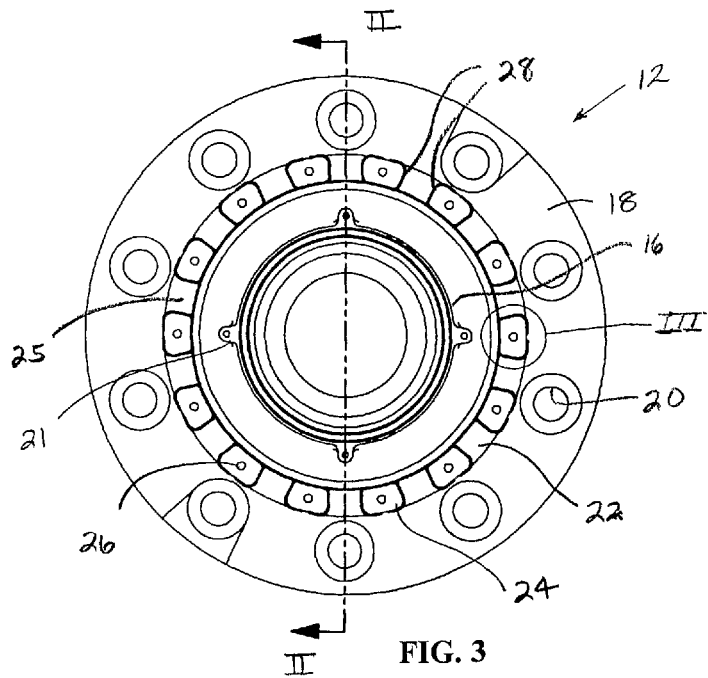
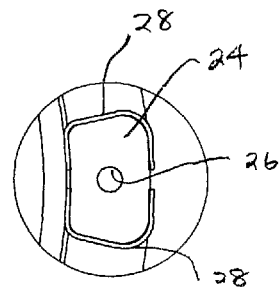
FIG. 3
FIG. 6
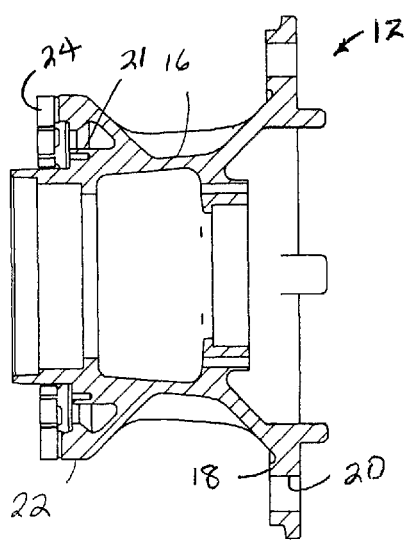
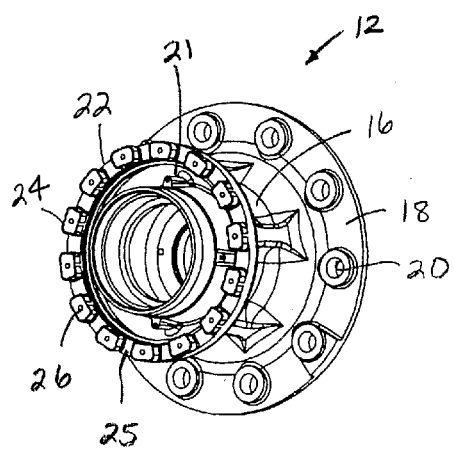
FIG. 4
FIG. 5

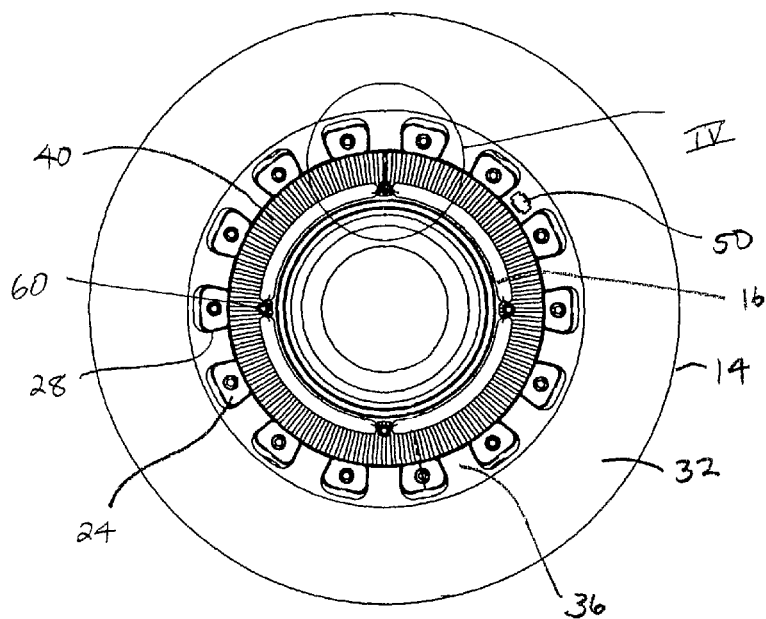
FIG. 12
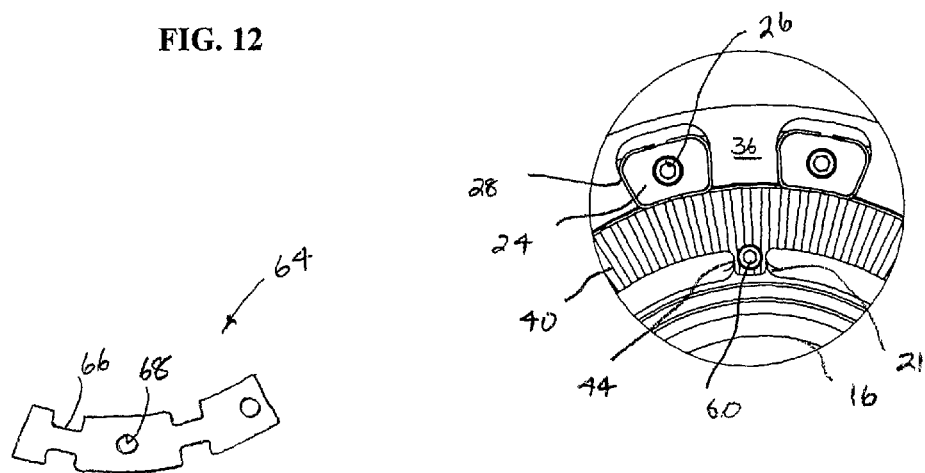
FIG. 13
FIG. 14

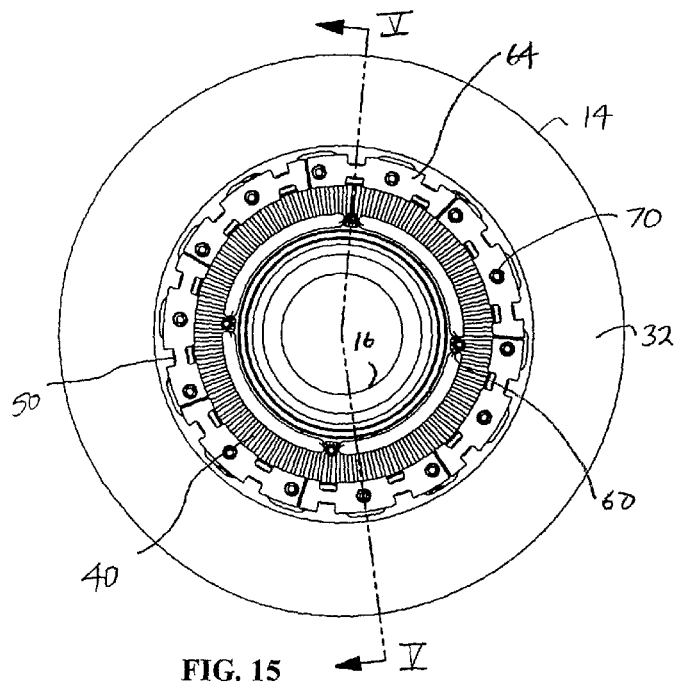
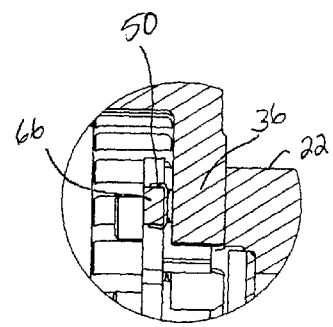
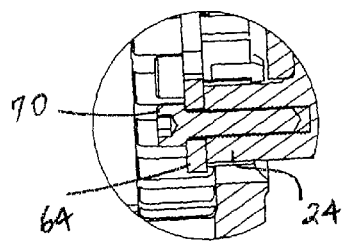
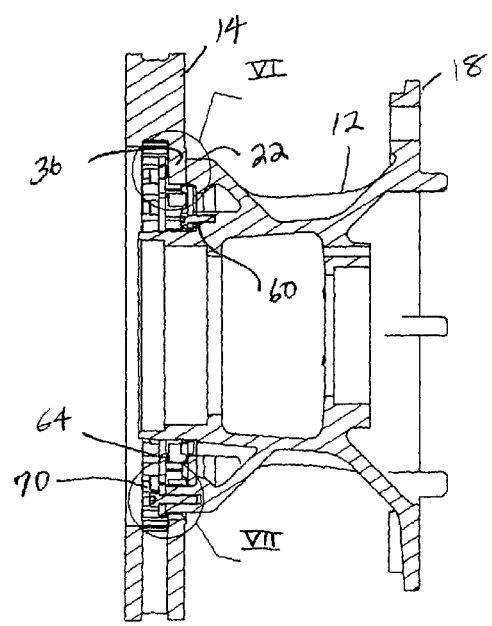
FIG. 15
FIG. 17
FIG. 18
FIG. 16

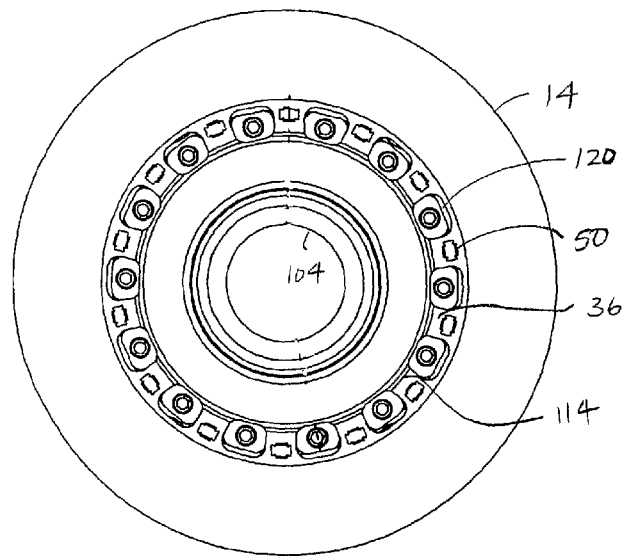
FIG. 22
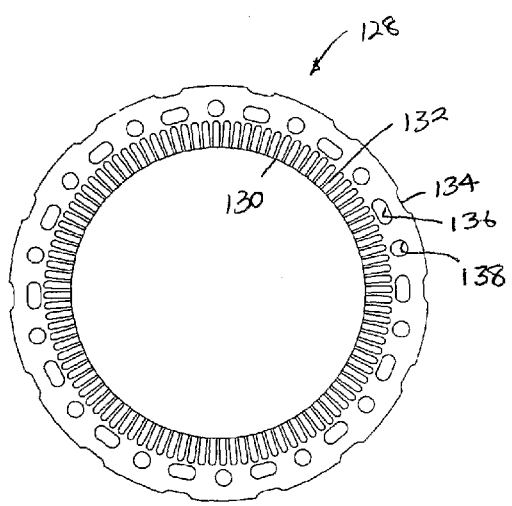
FIG. 25
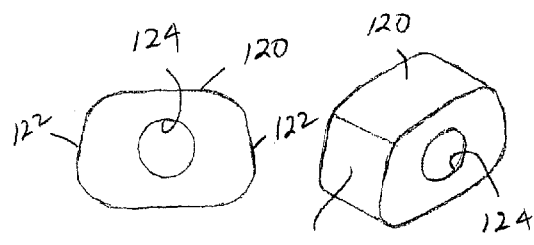
FIG. 23    FIG. 24

BRAKE ROTOR AND ABS TONE RING ATTACHMENT ASSEMBLY THAT PROMOTES IN PLANE UNIFORM TORQUE TRANSFER DISTRIBUTION

This application claims priority under 35 U.S.C. §119 from U.S. Provisional application No. 60/722,096 filed Sep. 30, 2005. The contents of this application are incorporated herein by reference.

BACKGROUND OF THE INVENTION

1. Field of the Invention

The invention relates to brake assemblies, especially vehicular brakes including brake rotors attached to wheel hubs. This invention also relates to brake assemblies that include anti-lock braking systems (ABS).

2. Description of Related Art

One type of common prior art brake design for vehicles is a two piece hat rotor and hub in which a hat rotor that carries the braking surface is detachably connected to a wheel hub. Another common type of brake design is an integrated one-piece rotor and hub assembly.

Integrated one-piece rotor and hub assemblies have the advantage that no fasteners are required between the rotor and the hub. As a result, the integrated assemblies do not face problems associated with fasteners such as wear and fatigue near fastener openings and potential misalignment due to imperfect machining and tolerance stack ups. A significant drawback, however, is that the assembly is constrained at the hub, which causes thermal distortion of the rotor. Such thermal distortion can damage the rotor, and when the rotor is damaged or worn, the entire integrated assembly must be replaced. This is expensive and time consuming.

Complete replacement is avoided by using a two piece hat rotor and hub assembly, which facilitates rotor replacement. When a rotor becomes worn or cracked, the rotor disc can be detached from the hub for a lower cost and easier replacement than with the integrated design. Hat rotors are typically one piece metal castings having a rotor portion integrally cast with a hat portion. The hat portion of the hat rotor is a large flange that fits over a mounting surface of the hub. The hat portion includes wheel stud apertures through which wheel studs can pass. Hat rotors can also be made as two pieces with a flat rotor disc fastened to the hat portion.

Hat rotors, however, also have some drawbacks. In particular, hat rotors and hubs are typically individual metal castings. Subsequent to casting, the hat rotor and the hub must both be individually machined. The machined surfaces of the rotor hat portion, the rotor braking surfaces, and the mounting surface of the hub must all be in the proper plane to minimize rotor run-out, which is the rotational misalignment of the rotor. Specifically, rotor run-out is the measurement of the extent to which the rotor wobbles, or deviates outside the intended plane of rotation, as the rotor rotates with the hub about the wheel shaft. Rotor run-out causes excessive and uneven wear in the rotor braking surfaces and in brake pads which contact the rotor braking surfaces. Rotor run-out also increases thermal distortion of the brake rotor. The thermal distortion results in thermal judder, noise, and vibrations during braking, as well as causing irregular braking pulsations. This can be a significant problem as it is very difficult to achieve perfect machining.

Another deficiency with hat rotor hub assemblies results from the manner in which a hat rotor and a wheel are mounted together on the hub. The hat rotor is installed over a mounting surface of the hub, and then the hat rotor is loosely mounted on the hub until a wheel is subsequently mounted on the hub. As wheel lug nuts are tightened to the wheel studs, the hat rotor is sandwiched between the wheel and the hub, thus securing the hat rotor to the hub. However, if the wheel lug nuts are not evenly tightened, the uneven forces acting on the hub may result in the distortion of the hub. Additionally, if the wheel rim has been improperly manufactured, the wheel rim might impose a distortion on the hub as the lug nuts are tightened. Any distortion on the hub will be directly transferred to the rotor, as the portion of the hub that is potentially distorted is also the mounting surface for the rotor in all hat rotor designs. This induces stress concentrations in the rotor during use.

A further concern of both integrated rotor hubs and hat rotor hubs is that the rotor in both of these designs is fixed with respect to the hub. During braking, the rotor in such an assembly is subjected to high frictional forces that generate heat in the rotor causing thermal expansion/distortion, temperature variation across the face of the rotor, and heat transfer to the adjacent components including the hub and the bearings. Thermal expansion of the rotor is very limited, in the radial direction, because of the integral connection between the rotor and the hub. This creates thermal coning in the rotor surface and a large thermal gradient, which will induce high thermal stress leading to thermal cracking. The high thermal gradient generated during braking and the effects of the thermal expansion and distortion can cause vibration and thermal judder across the brake surfaces, resulting in rough or irregular braking pulsations. The high thermal stress and thermal distortion also reduce the life and performance of the rotor and increase maintenance costs.

One way the thermal stresses have been addressed is to provide a "floating" rotor in which the fastener connection between the rotor and the hat or hub is provided with a small clearance or float that allows thermal expansion. Two-piece rotors also allow greater flexibility with respect to use with different hubs as the same rotor disc can be used with different hat portions. This reduces the cost since generic rotor discs may be used and only the hat portion requires specialized casting, tooling and machining steps. However, stresses induced by fastener assemblies in this design are also a consideration in two-piece hat rotors.

Typical rotor discs in two-piece hat designs have an attachment flange that is perforated to accept a fastener. The hat portion is placed on one side of the attachment flange and a fastener connects the hat portion to the side of the attachment flange. During braking, a frictional force is applied to the rotor surface, which creates torque that is transferred to the attachment flange, to the fastener, through the hat portion and to the hub. Because the hat portion is attached to one side of the attachment flange, which is in a plane axially displaced from the friction braking surface, a moment arm is created at this connection joint. When the torque is transferred through a moment arm, bending stresses are formed in the connection. This creates twisting in the areas adjacent the fastener, which can create fatigue leading to cracking and breaking. The perforated flange tends to become fatigued because the material of the rotor, cast iron for example, weakens at high temperatures leading to fatigue fractures. This also creates problems with run-out, as discussed above, along with premature fracture of components in the connection.

Torque transfer also tends to be non-uniform through the perforated flange, especially in a floating design, as the machining tolerance at each aperture causes certain connections to receive more torque than other connections. This creates high stresses at individual apertures and can cause the attachment flange to crack or to have portions break off.

The two-piece hat rotor assemblies discussed above also have drawbacks associated with the hat portion, which typically has slots that match with the perforations in the rotor attachment flange. Some floating type two piece hat rotor assemblies use a spacer, sometimes called a bobbin, to provide the clearance that accommodates thermal expansion. The bobbin fits in the slots of the hat piece or in slots of the rotor flange, and when torque is applied to the hat through the rotor, the bobbin twists in the slot. This twisting causes the edges of the bobbin, which are typically square to match the slot, to gouge the sides of the slots, thus damaging the slotted piece. This is especially true when the hat piece is manufactured from a material having a lower hardness, such as aluminum, which is popular in high performance and racing applications, or when the rotor is formed of cast iron.

In summary, prior art brake rotors have suffered from problems associated with wear and material fatigue due to stresses induced during the braking process, particularly bending stresses caused during torque transfer and non-uniform transfer of torque caused by machining tolerances. It would be desirable to reduce the stresses experienced by the rotor and, in the case of a two piece rotor, the hat piece to increase performance and durability.

This problem has been addressed in U.S. Pat. No. 7,077,247, which is commonly assigned with this application and incorporated by reference herein. In this patent, the fastener assembly includes a plurality of bobbins and fasteners. The fasteners extend through the hat portion and each bobbin to clamp the attachment flange between the hat portion and the bobbin. If desired, a spring can be disposed between the attachment flange and bobbin. The fastening assembly transfers torque from the braking surface to the hat portion in a common plane to prevent twisting. A crush zone can also be provided in association with the fastener assembly to promote uniform torque transfer distribution from the attachment flange to the hat portion.

While the above described system is effective, many braking assemblies now use anti-lock braking systems (ABS) in which an exciter or tone ring is associated with the rotor and hub so that the rotation of the wheel assembly can be detected by a sensor. There is a need to accommodate ABS technology in brake rotor assemblies while addressing the problems inherent in these assemblies relating to thermal expansion and bending stresses.

SUMMARY OF THE INVENTION

An aspect of embodiments of the invention provides a two-piece hat rotor with a tone ring that connects the components in a way that allows in plane torque transfer.

Another aspect of embodiments of the invention provides a fastener assembly to connect a rotor and hub including an ABS system that securely clamps the rotor to the wheel hub.

The invention is directed to a brake assembly comprising a rotor having a braking surface and an attachment flange, wherein the attachment flange includes a plurality of spaced tabs, and a hub having an axial body, a mounting surface extending from the axial body for attachment to a vehicle component, and a rotor support extending from the axial body. The rotor support includes a an axial surface that abuts the tabs of the rotor. A tone ring including a plurality of exciter formations is mounted for rotation with the hub. A clamping mechanism attaches the spaced tabs of the rotor to the axial surface of the rotor support.

The invention is also directed to a brake assembly comprising a rotor having a braking surface and an attachment flange, wherein the attachment flange includes a plurality of spaced tabs, and a rotatable hub having an axial body, a mounting surface extending from the axial body for attachment to a vehicle component, and a rotor support extending from the axial body. The rotor support includes an axial surface that abuts the tabs of the rotor and a plurality of spaced bobbins. A plate is fastened to the bobbins to clamp each tab of the rotor between a pair of bobbins so as to cause torque generated during braking to transfer from the rotor tabs to the bobbins and the hub in a common plane. An anti-lock braking system is coupled to the brake assembly including a tone ring.

These and other aspects of the invention will become apparent in view of the detailed description and drawings herein.

BRIEF DESCRIPTION OF THE DRAWINGS

The invention is described in conjunction with the following drawings in which like reference numerals designate like elements and wherein:

FIG. 3 is a front view of the hub of the brake rotor assembly of FIG. 1;

FIG. 4 is a side view in cross section taken along line II-II of FIG. 3;

FIG. 5 is a reduced front perspective view of the hub of FIG. 3;

FIG. 6 is an enlarged detail of section III of FIG. 3;

FIG. 12 is a front view of the assembly of FIG. 1 partially assembled with the rotor and tone ring positioned on the hub;

FIG. 13 is an enlarged detail of section IV of FIG. 12;

FIG. 14 is an enlarged top view of the top plate for use with the assembly of FIG. 1;

FIG. 15 is a front view of the fully assembled brake rotor assembly of FIG. 1;

FIG. 16 is a side view in cross section taken along line V-V of FIG. 15;

FIG. 17 is an enlarged detail of section VI of FIG. 16;

FIG. 18 is an enlarged detail of section VII of FIG. 16;

FIG. 22 is a front view of the second embodiment partially assembled with the hub of FIG. 19 and the rotor and bobbins positioned thereon;

FIG. 23 is an enlarged front view of a bobbin for use with the second embodiment;

FIG. 24 is a side perspective view of the bobbin of FIG. 23;

FIG. 25 is a front view of the top plate with integral tone ring of the second embodiment;

DETAILED DESCRIPTION OF PREFERRED EMBODIMENTS

The brake assembly disclosed herein is preferred for use on vehicles, including automobiles, racing vehicles, trucks, heavy duty trucks, motorcycles and the like. The vehicles suitable for use with this invention can include those vehicles having a gross vehicle weight of less than about 5,000 pounds, a gross vehicle weight of about 5,000 pounds to 12,000 pounds, and a gross vehicle weight of more than about 12,000 pounds, for example 30,000 pounds. However, the inventive concepts discussed herein can be used in any type of application that uses rotary brakes, including automotive, other types of motorized vehicles, or railcars.

Figure 1:
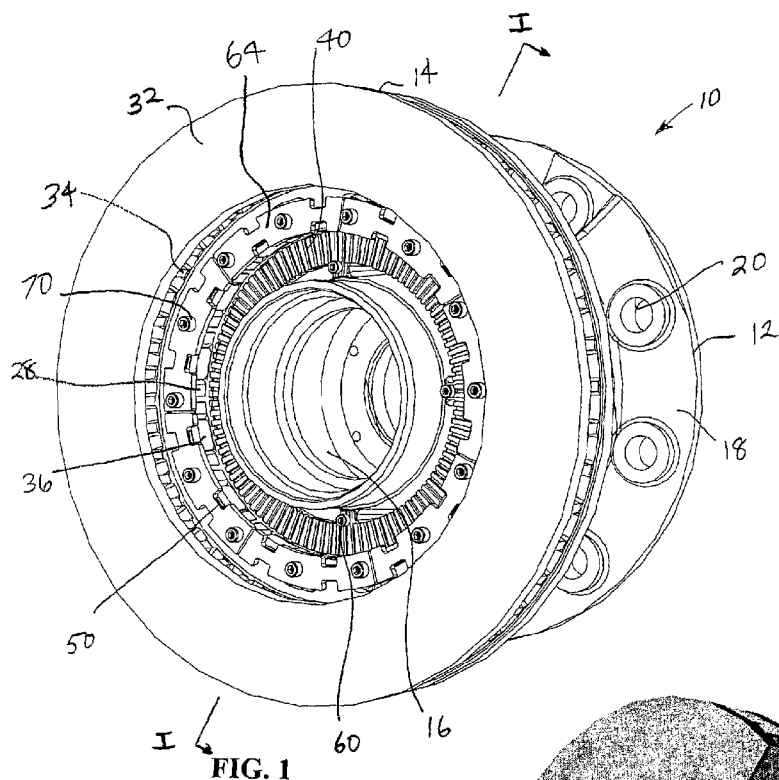
FIG. 1 is a front perspective view of a brake rotor assembly in accordance with an embodiment of the invention.

FIG. 1 shows a brake rotor assembly 10 in accordance with a first embodiment of the invention. The assembly 10 includes a hub 12 that supports a rotor 14. The hub 12, as used herein, can be a wheel hub, a rotating flange, a bearing housing of a hub assembly or the hat portion of an integrated rotor. The term hub in this application is intended to cover all known possible mountings for a rotor.

The hub 12, seen in detail in FIGS. 3, 4, and 5, includes an axial body in the form of a central cylinder 16 with a radial mounting flange 18 on one end having a plurality of mounting apertures 20 therein and a rotor support flange 22 on the other end. The rotor support flange 22 extends outwardly from cylinder 16 and has an outward end that is radially spaced from the central cylinder 16. A series of axially extending threaded bores 21 are located on the central cylinder 16 in the space between the cylinder 16 and the flange 22. The outward end of the rotor support flange 22 is an annular ring that extends around the central cylinder 16 and presents an axial face for mounting the rotor 14 thereon. The axial face has a plurality of spaced bobbin tabs 24 that form axially raised portions with depressed portions 25 therebetween. Each bobbin tab 24 is formed in a generally trapezoidal shaped with angled side walls. A threaded aperture 26 is formed in each bobbin tab 24. As seen in detail in FIG. 6, preferably a generally u-shaped clip 28 may be attached to the side of a number of bobbin tabs 24. Of course, a single clip 28 or a smaller segment could also be used.

The hub 12 can be made of any conventional material, such as cast iron or ductile iron. Typically, hubs are not corrosion protected. The clip 28, therefore, is preferably made of a corrosion resistant material, such as stainless steel. The clip 28 forms a shim between the hub 12 and the rotor 14 when assembled to offer corrosion protection between the elements.

Figure 7:
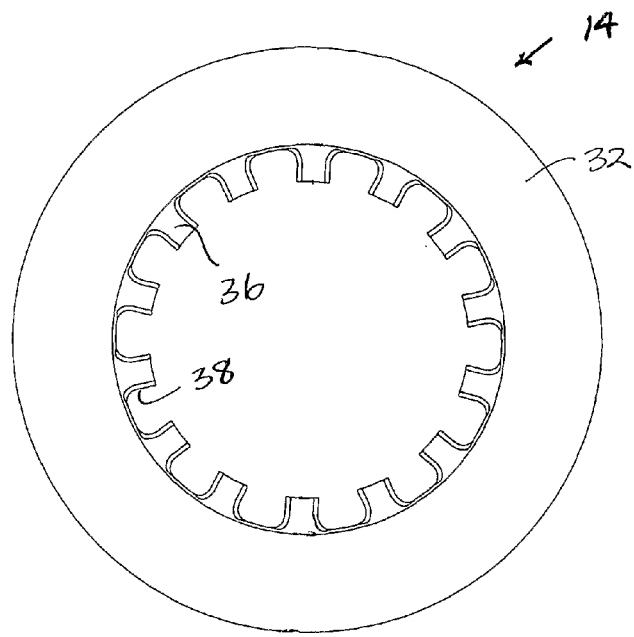
FIG. 7 is a front view of the rotor in accordance with the assembly of FIG. 1.

The rotor 14 is seen in detail in FIG. 7. The rotor 14 is formed as a disc having opposed braking surfaces 32 separated by vanes 34 (seen in FIGS. 1 and 2) to form a ventilated disc. Of course, a disc formed as a flat plate with a single surface or opposed braking surfaces can also be used, as would be readily recognized by one of ordinary skill in the braking art. The braking surface 32 preferably carries a friction material. On the inner periphery of the annular disc, a series of spaced connection tabs 36 are formed. Each tab 36 extends radially inwardly and is preferably formed as a solid tab, with no aperture needed for a fastener, as would be required for a conventional or two-piece floating rotor. However, apertures could be present without affecting the operation of the invention. Each tab 36 presents a pair of side surfaces 38 that extend radially or at an angle, which will engage with the hub 12, as discussed below. If desired, the side surface 38 can have a surface treatment, such as threads, serrations, or dimples, to yield in response to stresses induced by manufacturing irregularities. The rotor disc 14 is preferably made of cast iron. For example, a suitable material would be Class 35 cast iron, which has a tensile strength of about 35 ksi and a yield strength of about 28 ksi.

Figure 8:
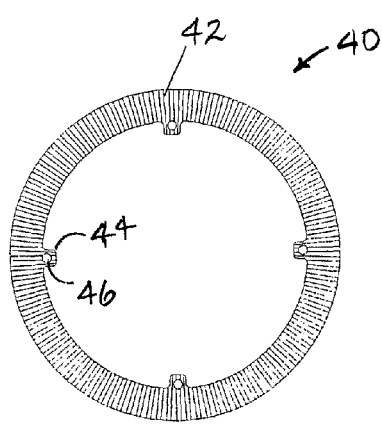
FIG. 8 is a front view of the tone ring in accordance with the assembly of FIG. 1.

The brake rotor assembly 10 of this invention is designed for use with an anti-lock braking system (ABS) in which an exciter or tone ring 40 is provided to operate with a sensor, not shown, to sense rotation of the assembly. As ABS assemblies are well known, no further description of the sensor and its operation is necessary. This invention can operate with any known conventional ABS assembly. The tone ring 40 in accordance with this invention is shown in detail in FIG. 8. The ring 40 is formed with radially spaced teeth 42, or ridges and valleys, that extend around the circumference of the ring on a radially face thereof. The tone ring 40 can be made as a single ring and can be made of powder metal, steel, or cast steel, for example. Any known type of exciting mechanism may be used in place of the teeth, including for example slots. A series of spaced connection shoulder 44 are provided around the inner periphery of the ring. Each shoulder 44 has a through hole 46.

Figure 9:
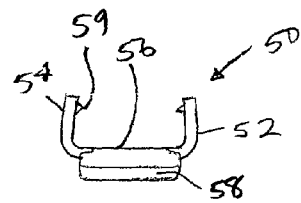
FIG. 9 is an enlarged side view of the clip for use with the assembly of FIG. 1.
Figure 10:
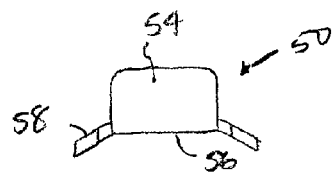
FIG. 10 is an enlarged view of another side of the clip of FIG. 9.
Figure 11:
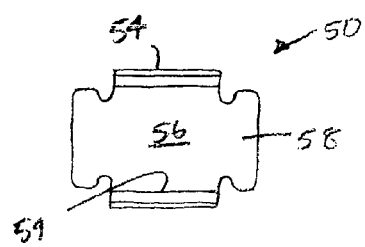
FIG. 11 is an enlarged top view of the clip of FIG. 9.

A spring clip 50 preferably used with this invention is shown in FIGS. 9-11. The spring clip 50 is formed of a body 52 of bent metal forming a U-shape with side walls 54 and a base 56. Extending from each side of the base 56 are wings 58 that form a leaf spring. A shelf 59, or some protrusion such as dimples, extends slightly inwardly from each side wall 54. The spring clip 50 can be made of stainless steel, powder or stamped, for example. The assembly and operation of the clip 50 is described below.

FIG. 12 shows the components partially assembled with the rotor 14 positioned on the hub 12 and the tone ring 40 mounted to the hub 12. As seen in detail in FIG. 13, the tone ring 40 is secured to the hub 12 by a fastener 60 extending through the hole 46 in the shoulder 44 and into the threaded bore 21. The rotor 14 is positioned such that each connection tab 36 is mounted in the depressed area 25 between two bobbin tabs 24. The clips 28 are positioned between the side walls 38 of the connection tabs 36 and the side walls of the bobbin tabs 24 to form a non-corrodible connection. As can be appreciated, the shear forces generated during braking are transferred from the rotor 14 to the hub 12 in a common plane through the side walls of tabs 24, 36, which eliminates bending stresses.

To secure the rotor 14 in place on the hub 12, a top plate 64 is used to clamp the connection tab 36 to the rotor support flange 22. The top plate 64 is formed as a partial arcuate segment. A series of top plates 64 are used to cover the entire inner circumference of the rotor 14. Of course, a solid annular ring or semi-circular segments could also used rather than segments. As seen in FIG. 14, the top plate 64 is formed as a flat plate with spaced indented sections 66. The top plate 64 is preferably formed of carbon steel, but can be any known material suitable for brake applications. A plurality of fastener openings 68 are provided to align with the openings 26 in the tabs 24.

Figure 2:
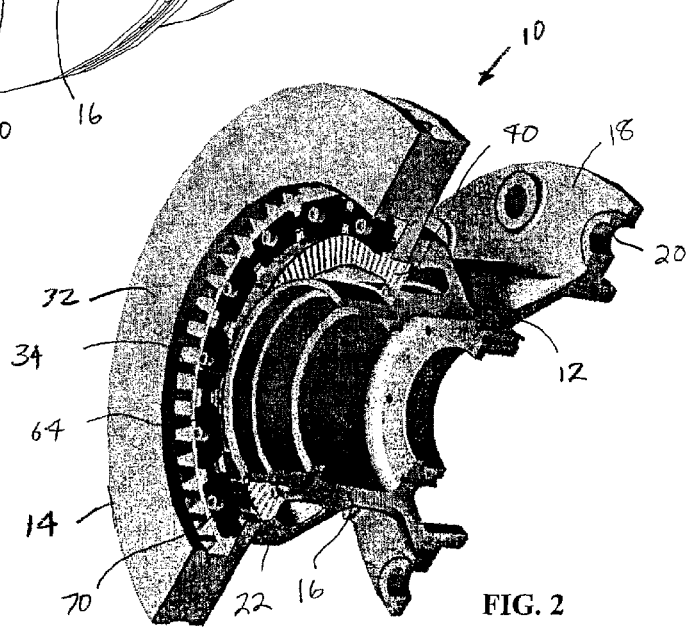
FIG. 2 is a front perspective cross sectional view taken along line I-I of FIG. 1.

The complete assembly is shown in FIGS. 1, 2, and 15. The top plates 64 clamp over the connection tabs 36 and are secured to the bobbin tabs 24 by fasteners 70, seen in detail in FIGS. 16 and 18. The bobbin tabs 24 are slightly larger or higher than the connection tabs 36. As seen in detail in FIGS. 16 and 17, the spring clips 50 are fastened to the indented sections 66 of the top plate 64 to bias the top plate with respect to the tabs 36 in the space formed between the top plate 64 and the connection tabs 36 due to the slightly larger height of the bobbin tabs 24. The spring clip 50 provides a tight rattle-free connection and accommodates thermal expansion. A spring clip 50 is also shown schematically positioned on the tab 36 in FIG. 12.

This assembly provides a secure connection in which forces are transferred in a common plane, while accommodating an ABS component. In operation, the rotor disc 14 rotates with the wheels of the vehicle. Upon application of a braking force by pressing brake pads against the braking surface 32, the friction force times the distance from the center of the piston to the center of the disc creates torque. The torque is transferred from the rotor 14 to the hub 12 to the wheel to effect braking. Specifically, torque is transferred through the connection tabs 36 to the bobbin tabs 24. The bobbin tabs 24 transfer the torque to the support flange 22, which then transfers it to the wheels through the mounting flange 18. The interaction between the side edges of the tabs 36 and the bobbin tabs 24 will only allow in-plane torque transfer, which reduces the twisting moment on the rotor flange and the ABS ring, which is conventionally attached to the disc rotor. In this invention, the reduction in twisting of the ABS ring prevents a failed ABS signal caused by induced runout to the sensor.

A significant advantage that this configuration has over prior art configurations is that the connection of the hub 12 to the rotor 14 is effected in the same plane as the rotor disc. By clamping the tabs 36 of the rotor 14 with the fastening assembly, the friction force experienced by the braking surface 32 is transferred as torque directly in the same plane to the hub 12. As the connection created by the fastener assembly is in axial alignment with the rotor disc, no moment arm is created. This transfers the torque without bending, which can create problems with run-out and premature fracture.

This invention also offers the advantage of a lower rotor failure rate. As the rotor 14 in accordance with this invention has tabs for attachment, rather than perforations as in conventional rotors, failure of the attachment flange is greatly reduced. In conventional rotors, the attachment flange has a plurality of apertures that receive fasteners. As the rotor is heated due to the braking force, the strength of the flange drops since cast iron has a low fatigue strength. In the perforated flange, which is typically made of cast iron, the connection between the fastener and the perforated flange induces stress concentrations on the edge of the perforations. As a result, the flange tends to fail. In this invention, use of the perforations for making the connection is eliminated. The rotor is driven through the radial side edges of the tabs, which are stronger and accordingly resist failure.

This invention also accommodates thermal expansion of the rotor in each direction, while eliminating rattling. The spring clip can be compressed a certain amount, which allows for thermal expansion, and clearance is provided at the outer edges of the connection tabs that face radially inwardly, which also accommodates thermal expansion. Further, since the spring clip 50 is compressed against the tab upon assembly, the tab will not rattle due to the clearances described above. This configuration also has the advantage of only compression loading the spring clip 50. Since the clip 50 is not restrained in the circumferential direction or the radial direction of the rotor, it does not experience torsional and bending loading, which could cause a spring to fail.

Figures 19, 20, 21:
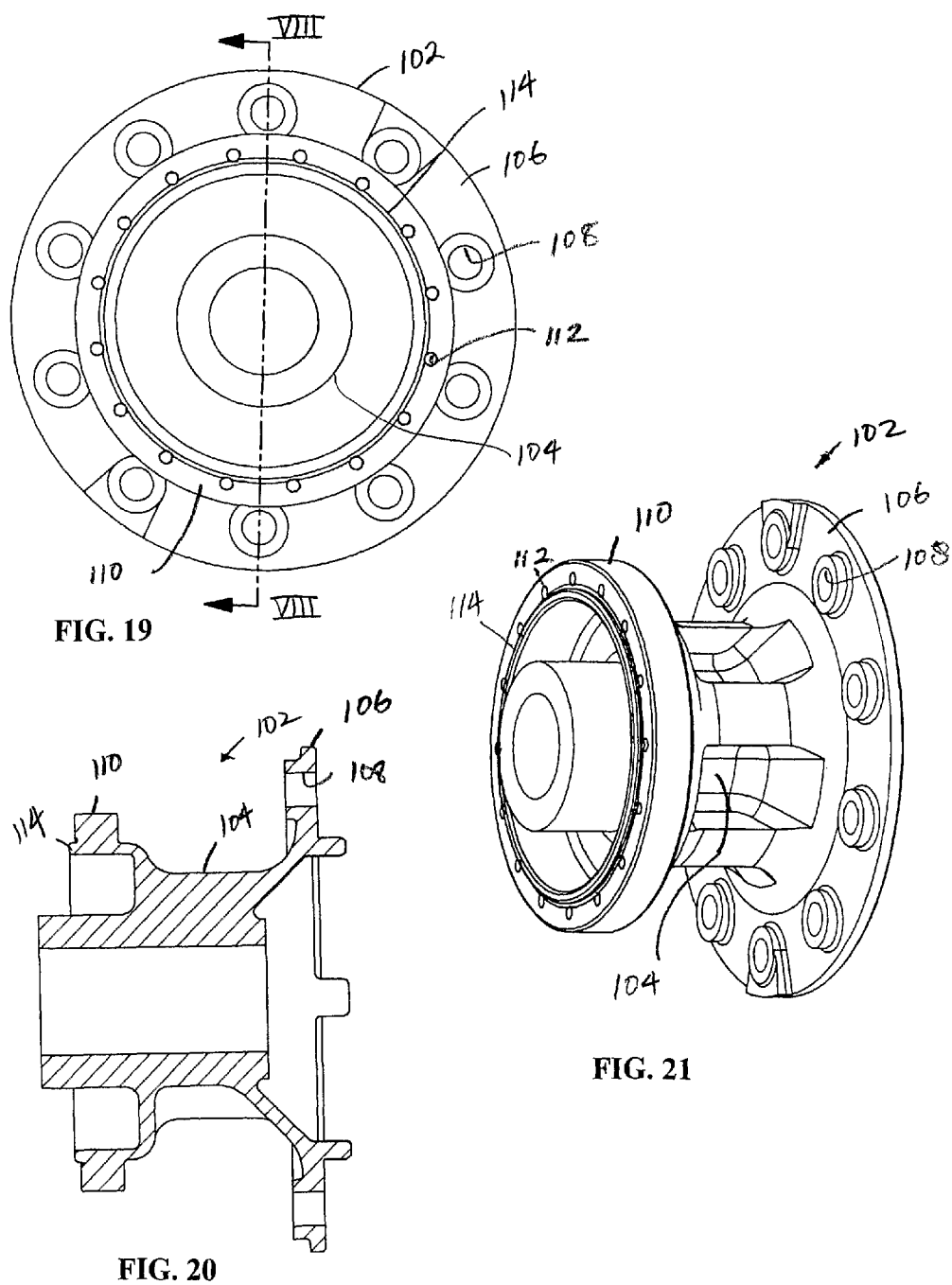
FIG. 19 is front view of the hub in accordance with second embodiment of the invention, shown assembled in FIG. 26.
FIG. 20 is a side view in cross section taken along line VIII-VIII of the hub of FIG. 19.
FIG. 21 is a front perspective view of the hub of FIG. 19.
Figure 26:
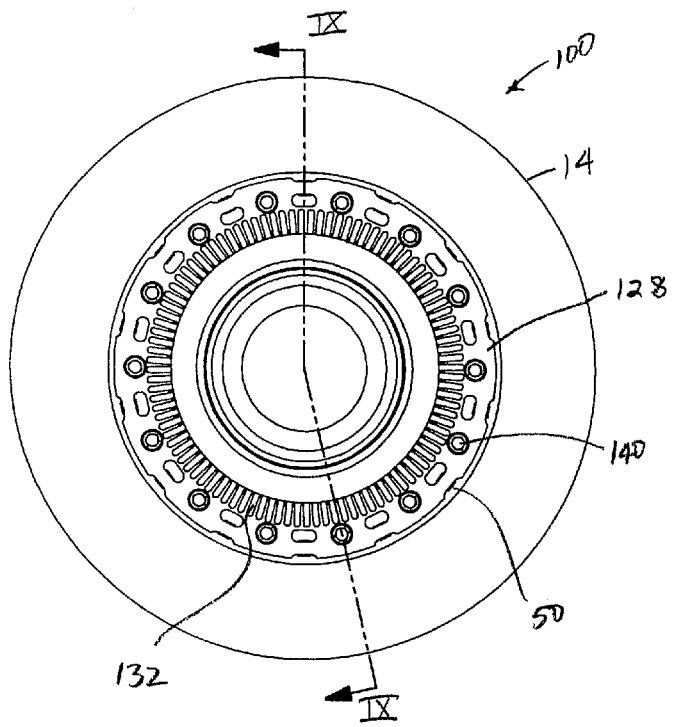
FIG. 26 is a front view of the brake rotor assembly of the second embodiment.

A second embodiment is shown in FIGS. 19-29, with FIG. 26 showing the entire assembly 100. In this embodiment, the tone ring and the top plate are formed as one structure to reduce the number of components needed and to simplify assembly. Referring to FIGS. 19-21, the difference between the hub 12 and the modified hub 102 is the rotor mounting flange. Hub 102 has a central cylinder 104 with a radial mounting flange 106 on one end having a plurality of mounting apertures 108 therein and a rotor support flange 110 on the other end. The rotor support flange 110 is spaced from the central cylinder 104. The rotor support flange 110 is an annular ring that extends around the central cylinder 104 with a series of spaced threaded apertures 112 and presents an axial face for mounting the rotor 14 thereon. An inner raised lip 114 is provided on the inner periphery of the flange 110. The same rotor 14 shown in FIG. 7 is used with this embodiment.

As seen in FIG. 22, the rotor 14 is positioned on the hub with the tabs 36 overlapping the rotor support flange 110. The tabs 36 are positioned with the assistance of the raised lip 114. A series of bobbins 120, seen in detail in FIGS. 23 and 24, are provided between the tabs 36 positioned over the apertures 112. Each bobbin 120 is trapezoidal in shape with side walls 122 and a through hole 124, similar in shape and function to the bobbin tabs 24 of the first embodiment. The bobbins 120 are preferably made of a strong corrosion resistant material, such as stainless steel.

A top plate 128, seen in detail in FIG. 25, is formed as an integral ring with the inner periphery 130 defining a tone ring having a series of radial teeth 132, or peaks and valleys, that may be detected by an ABS sensor, as is known. The top plate 128 has spaced indents 134 formed on the outer periphery and matching slots 136 formed in the central portion. A series of spaced apertures 138 are also formed therethrough. Of course, the top plate 128 could also be formed as series of arcuate or semi-circular segments.

Figure 28:
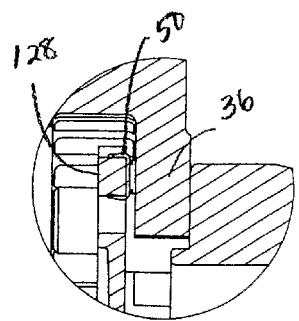
FIG. 28 is an enlarged detail of section X of FIG. 27.
Figure 29:
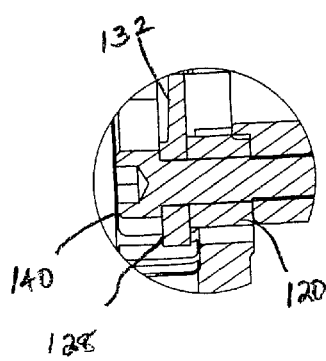
FIG. 29 is an enlarged detail of section XI of FIG. 27.
Figure 27:
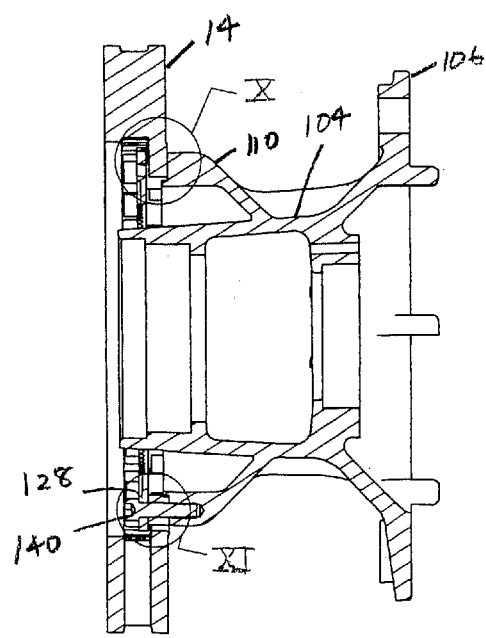
FIG. 27 is a side cross sectional view of the assembly taken along line IX-IX of FIG. 26.

When completely assembled, the top plate 128 is secured over the tabs 36 and bobbins 120 with a fastener 140, as seen in FIGS. 26 and 29. The spring clip 50, as in the first embodiment, is clipped to the top plate 128 adjacent to the tabs 36, as seen in FIGS. 22 and 28. As the bobbins 120 are slightly larger than the tabs 36, the spring clips 50 are accommodated in the space created above the tabs 36. This is seen in the detail of FIG. 28. The side walls 54 of the clips 50 snap over the indents 134 and slots 136 via the protrusions 59.

This embodiment operates in the same manner as the first embodiment in that forces are transferred in the same plane through the connection tabs 36 of the rotor 14 and the bobbin side walls 122 and fastener 140. The spacing also allows for thermal expansion as in the first embodiment.

Various applications are suitable for this invention. The rotor assembly can be used on automobiles, both road vehicles and racing cars. It is also applicable to motorcycles and off road vehicles, such as all terrain vehicles and earth moving equipment. In short, the invention can be applied to any motorized vehicle. It is further contemplated that this invention can be used in a railway environment on railcars.

The invention is not limited to those embodiments described herein and may encompass various changes and modifications. It will be understood that the various modifications shown herein can be used in any combination. It is also possible to eliminate various components of the assembly and still have an effective connection. For example, the springs or clips may be omitted. Further, different materials may be used to obtain similar results.

What is claimed is:

1. A brake assembly comprising:
   a rotor having a braking surface and an attachment flange, wherein the attachment flange includes a plurality of spaced tabs;
   a hub having a mounting surface extending from an axial body for attachment to a vehicle component, and a rotor support extending radially from the axial body, wherein the rotor support includes an axial surface that is parallel to the braking surface, abuts the plurality of spaced tabs of the rotor and has a plurality of axially extending bobbins, integrally formed or each affixed by a single fastener, positioned on the axial surface of said rotor support and forming depressions therebetween, wherein the plurality of spaced tabs of the attachment flange of the rotor are positioned between the bobbins in the depressions, abutting the axial surface of the rotor support;

U-shaped shim clips made of non-corrosive material positioned between the tabs of the rotor and the bobbins; and a clamping mechanism that clamps the plurality of spaced tabs of the rotor against the axial surface of the rotor support, the clamping mechanism including a plate, spring clips to bias the plate with respect to the plurality of spaced tabs and at least one fastener, the plate having a tone ring formed thereon.

2. The brake assembly of claim 1, wherein the plate is an annular ring.

3. The brake assembly of claim 2, wherein the tone ring is integrally formed on an inner circumference of the annular ring.

4. The brake assembly of claim 1, wherein the tone ring is fastened to the axial body of the hub.

5. The brake assembly of claim 1, wherein each bobbin has an opening formed therein.

6. The brake assembly of claim 1, wherein the bobbins are integrally formed on the axial surface of the rotor support with the clamping mechanism secured over the bobbins and the tabs.

7. The brake assembly of claim 1, wherein each bobbin is a separate element.

8. The brake assembly of claim 7, wherein each bobbin is made of non-corrosive material.

9. The brake assembly of claim 7, wherein the clamping mechanism is secured over the bobbins and the tabs of the rotor.

10. The brake assembly of claim 1, wherein the spring clips axially bias the clamping mechanism with respect to the rotor tabs.

11. A brake assembly comprising:
a rotor having a braking surface and an attachment flange, wherein the attachment flange includes a plurality of spaced tabs;
a mounting surface extending from an axial body for attachment to a vehicle component, and a rotor support extending from the axial body, wherein the rotor support includes an axial surface that abuts the plurality of spaced tabs of the rotor and has a plurality of axial extending spaced bobbins, integrally formed or each affixed by a single fastener;
U-shaped shim clips made of non-corrosive material positioned between the tabs of the rotor and the bobbins; and
a plate fastened to the bobbins to clamp each tab of the rotor between a pair of bobbins and having spring clips to bias the plate with respect to the plurality of spaced tabs, wherein a tone ring is formed on the plate fastened to the bobbins.

12. The brake assembly of claim 11, wherein the plate is an annular ring.

13. The brake assembly of claim 11, wherein the bobbins are integrally formed with the axial surface of the rotor support.

14. The brake assembly of claim 11, wherein the bobbins are separate elements.

15. The brake assembly of claim 11, wherein each bobbin has a hole formed therethrough.

16. The brake assembly of claim 15, further comprising fasteners that extend into each hole and secure the plate to the bobbin.

17. The brake assembly of claim 11, wherein the bobbins have a height greater than a height of the rotor tabs.

18. The brake assembly of claim 11, wherein torque generated during braking is transferred from the rotor tabs to the bobbins and the hub in a common plane.

19. A brake assembly comprising:
a rotor having a braking surface and an attachment flange, wherein the attachment flange includes a plurality of spaced tabs;
a mounting surface extending from an axial body for attachment to a vehicle component;
a rotor support extending from the axial body, wherein the rotor support includes an axial surface that abuts the plurality of spaced tabs of the rotor and has a plurality of axial extending spaced bobbins, integrally formed or each affixed by a single fastener;
shim clips comprising a non-corrosive material positioned between the tabs of the rotor and the bobbins; and
a plate fastened to the bobbins to clamp each tab of the rotor between a pair of bobbins and having spring clips to bias the plate with respect to the plurality of spaced tabs.

* * * * *

UNITED STATES PATENT AND TRADEMARK OFFICE
CERTIFICATE OF CORRECTION

PATENT NO. : 9,291,227 B2  
APPLICATION NO. : 12/088826  
DATED : March 22, 2016  
INVENTOR(S) : Burgoon et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1096 days.

Signed and Sealed this
Second Day of August, 2016

Michelle K. Lee
*Director of the United States Patent and Trademark Office*